April 9, 1963 J. W. DORSAK ET AL 3,084,492
FILTER FOR INCUBATOR
Filed March 4, 1960 2 Sheets-Sheet 1

INVENTORS
JOHN W. DORSAK
THOMAS F. VAN DENBERG
BY
Oberlin, Maky & Donnelly
ATTORNEYS April 9, 1963  J. W. DORSAK ET AL  3,084,492
FILTER FOR INCUBATOR
Filed March 4, 1960
2 Sheets-Sheet 2
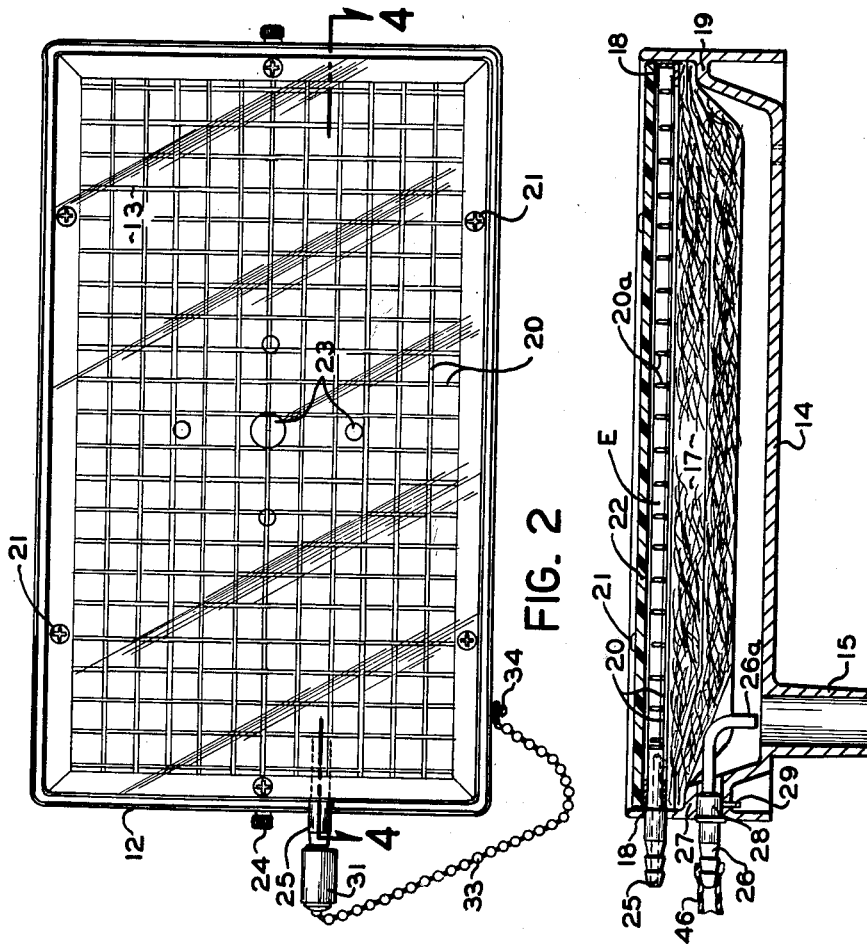
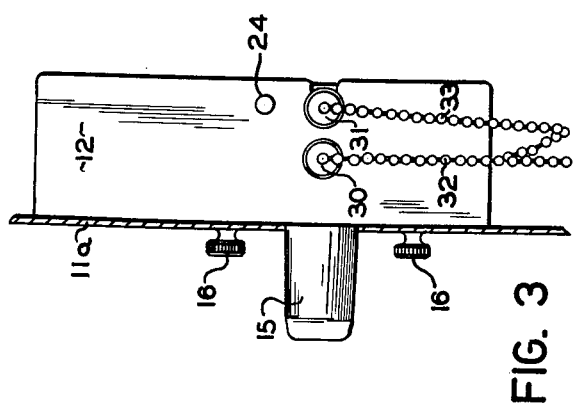
INVENTOR.
JOHN W. DORSAK
THOMAS F. VAN DENBERG
BY
Oberlin, Maky & Donnelly,
ATTORNEYS 3,084,492
FILTER FOR INCUBATOR
John W. Dorsak, Lyndhurst, and Thomas F. Van Denberg, Chagrin Falls, Ohio, assignors, by mesne assignments, to Air Reduction Company, Incorporated, a corporation of New York
Filed Mar. 4, 1960, Ser. No. 12,748
13 Claims. (Cl. 55—265)

The present invention relates to a flow control unit and, more particularly, to a filter unit especially adapted for use with a baby incubator.

It is, of course, important to control conditions extant within an incubator for the comfort and health of the infant whom it contains. Not only is it necessary to filter air supplied to the incubator to remove airborne contaminants, but often an infant, especially if prematurely born, requires oxygen-enriched air, that is, air containing more than the usual 20 percent or so of oxygen normally found in the atmosphere. For example, air containing about 40 percent oxygen may be supplied to an incubator. In certain instances, it may be necessary to supply an atmosphere of 70 percent or even greater percent oxygen.

The present unit is designed to satisfy all of these requirements. In addition to functioning as a filter for the nursery or atmospheric air fed into an incubator, our unit operates selectively either as a blender to admix oxygen with the nursery air (while still filtering the air), or as a supply of substantially pure oxygen, in which case the admission of the nursery or atmospheric air is automatically stopped. If desired, a modification of our unit may be used in which a blend of oxygen and air or just oxygen may be injected into an incubator without a filtering action.

It is, therefore, a principal object of the invention to provide a flow control unit.

Another object is to provide an improved filter unit for an incubator.

A further object is to provide a filter unit adapted to blend oxygen and air at substantially the same ratio over varying demands in oxygen volume flow.

A still further object is to provide a filter unit adapted selectively to supply either a blend of air and oxygen or oxygen entirely.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawing:

FIGURE 2 is a front elevational view of the filter unit of FIGURE 1;

FIGURE 3 is a left-hand end view of FIGURE 2;

FIGURE 4 is a section of FIGURE 2 on the line 4—4;

Figure 1:
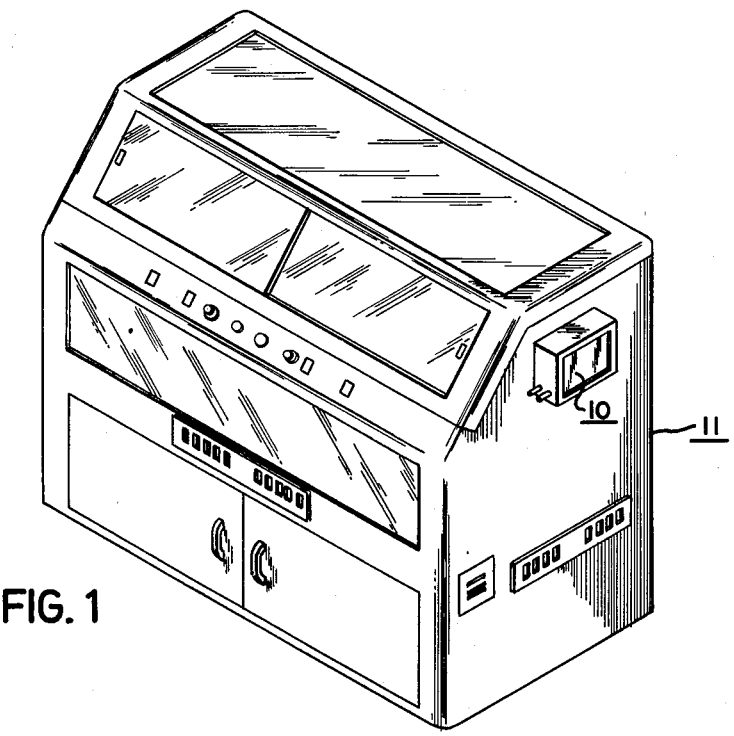
FIGURE 1 is a perspective view of an incubator equipped with a filter unit of the present invention.

The present unit, generally indicated at 10 in FIGURE 1, may be readily attached to a therapeutic cubicle such as an incubator 11, either as an original accessory or as an added feature to an incubator already in use. The structure of our unit is not therefore dependent on the incubator, and the latter is not here described in detail. For purposes of illustration, the incubator 11 may be of the type described in U.S. Patents No. 2,417,962 and No. 2,662,521 which are hereby incorporated by reference.

Referring to FIGURES 2 to 4, the compact unit illustrated includes a generally rectangular casing 12 having an open face indicated at 13 on one side, through which to receive air, and a closed face 14 on the opposite side provided with a discharge conduit 15. The casing 12 may be an aluminum casting. Ordinarily, a wall or skirt of an incubator 11a has a suitable opening to receive the conduit 15 (FIGURE 3) after which the conduit may be connected as by a rubber hose to the air chamber of an incubator or as desired. Knurl screws 16 aid in holding the unit 10 to the wall 11a. Filter means are carired by the casing 12 between the open face 13 and the discharge conduit 15. In the embodiment shown the filter 17 comprises a pair of pads composed of bonded glass wool. In one embodiment each pad was about one-half inch thick and presented approximately 0.5 square foot of surface. Other known filtering means may also be used including fibers of natural and/or synthetic materials.

A U-shaped channel section 18 holds the filter 17 against an inward flange 19 on the casing. The channel section 18 contains a metal screen 20 composed, for example, of aluminum. The upper and lower sides of the screen terminate in legs 20a which are bent toward the open face 13 of the unit. By this arrangement, the screen 20 supports the filter 17 in a flat plane and prevents it from bulging. Small bolts 21, in turn, retain a closure sheet 22 having openings 23 against the channel section 18 by suitably engaging threaded openings in a facing side of the channel section 18. The closure sheet is preferably composed of a transparent plastic such as polymethacrylate, polystyrene, etc. All of such parts are held in the described assembly relation by knurled lock screws 24 which engage threaded openings extending through the casing 12 and which terminate in aligned openings in the bight portion of the channel section 18. It will be noted that the closure sheet 22, channel 18, and filter 17 define an entry chamber E which is substantially enclosed except for the openings 23. This serves to limit gas flow into the chamber E and aids in blocking off such inflow as hereinafter described.

A forward inlet tube 25 extends through the casing 12, to which the tube may be suitably secured, and then into the entry chamber E, that is, on the upstream side of the filter 17. The channel 18 is broken to admit tube 25 as shown in FIGURE 2. Tube 25 has a central bore which communicates with an outlet opening directed toward the filter 17 as indicated. A rearward inlet tube 26 also extends through the casing to communicate with the interior thereof behind or on the downstream side of the filter 17. A collar 27 formed directly in the cast casing and as part of the flange 19 receives a ferrule 28 which, in turn, accommodates the tube 26. A pin 29 fixes the ferrule 28 to the casing. The terminal portion 26a of tube 26 curves rearwardly into a substantially coaxial position with the discharge conduit 15. Removable rubber caps 30 and 31 selectively close off the tubes 26 and 25, respectively. To guard against loss, chains 32 and 33 are secured to the ends of the caps 30 and 31, respectively, and are jointly held to the casing 12 by a set screw 34.

Figure 5:
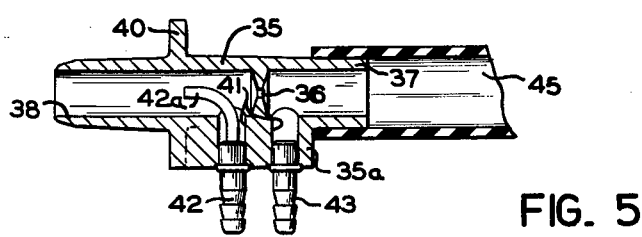
FIGURE 5 is a longitudinal cross-sectional view of a modification in which a filtering action is not used.
Figure 6:
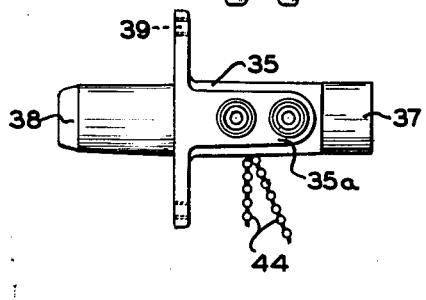
FIGURE 6 is a bottom plan view of FIGURE 5.

FIGURES 5 and 6 illustrate a modified embodiment in which there is no filtering action. In this case a conduit 35 has an internal restrictive orifice 36 to define on opposite sides an entrance end 37 and an exit end 38. Fasteners pass through openings 39 in a flange 40 of the conduit 35 to secure this embodiment to a wall of an incubator, so that end 38 passing through a suitable opening in such wall can deliver the discharge to an incubator. The conduit 35 has a radially enlarged portion 35a provided with bores 41 to receive inlet tubes 42 and 43.

The latter straddle the restrictive orifice 36. Inlet tube 42 has a curved terminal 42a which is aligned substantially coaxially with the exit end 38 as in the case of tube 26. Chains 44 attached to the conduit 35 may carry caps to cover the tubes 42 and 43 as for the previously described embodiment. A hose 45 leading, for example, to an adjacent window may be used over the entrance end 37 when air other than nursery air is to be aspirated. The restrictive orifice 36 insofar as resistance is concerned thus serves the same purpose as the filtering material of the embodiment of FIGURES 2 to 4 and operates in the same manner with respect to blending oxygen fed through inlet tube 42 and air entering through end 37.

The operation of either embodiment with respect to the addition of oxygen is substantially the same. The description therefore will be confined to the preferred embodiment of FIGURES 2 to 4. It is intended, of course, that this unit may be used strictly for filtering purposes. Usually a slight sub-atmospheric pressure is maintained within the incubator as by a fan or other air-impelling means. During normal operation, an incubator is always exhausting air. A sub-atmospheric pressure of as little as 0.04 inch of water is sufficient to induce air through the units of our invention and into an incubator. Normally during this operation, the caps 30 and 31 close off the inlet tubes 25 and 26. The filter 17 is preferably dimensioned to establish a given resistance to a particular "suction" or draft. This may be accomplished by using a definite thickness of filter material as well as a particular area. When the filter has a thickness of approximately one inch and a surface area of 0.5 square foot and a "suction" of about 0.04 inch of water is used, the delivery of air into an incubator is approximately 10 liters per minute. When it is desired to blend oxygen with air passing through the filter, cap 30 is removed and a supply of oxygen is admitted through inlet tube 26, as by a hose 46 leading from a cylinder of oxygen. Since the terminal 26a curves into conduit 15 as described, the oxygen is directly injected into the conduit 15 and then into the incubator. It is emphasized that this action causes a secondary aspiration which increases the overall "suction" on the back of the filtering material 17. Normally, it is desirable for the resulting blend to contain about 40 percent oxygen. Oxygen injected into tube 26 is substantially 100 percent pure and would have to be diluted about 3.15 times with ordinary atmospheric air to create about a 40 percent concentration within the incubator. This means that with a normal 10 liters per minute flow of air coming into the filter as described, a flow of approximately 3 liters per minute of oxygen through the inlet tube 26 yields a concentration of approximately 40 percent oxygen in the incubator. However, as the flow of 100 percent pure oxygen through tube 26 increases, the described secondary aspiration increases in proportion. This draws an additional amount of air through the filtering material above the mentioned 10 liters per minute necessary to maintain the dilution at approximately 40 percent oxygen. It is emphasized that with our unit, due to the described arrangement of parts, the proportion remains at approximately 40 percent even though the volume of air flow into the unit ranges from as little as 3 liters per minute to as much as 12 liters per minute. The secondary aspiration is thus effective upon an increase of oxygen flow through tube 26 substantially to maintain the desired oxygen to air ratio.

When, as under emergency conditions, it is desired to flow a greater percentage of oxygen into the incubator, for example 70 to 100 percent oxygen, cap 30 is replaced on tube 26 and cap 31 is removed so as to admit oxygen through the inlet tube 25. To avoid the necessity of a turbulent or an excessively high volume flow of oxygen to reach a desired high percentage of oxygen within the incubator, the inlet tube 25 is located in such a manner as to spread the oxygen flow against the face of the filtering material 17. In this manner, the oxygen blankets the entry chamber E and excludes to the extent desired the entry of nursery air through the openings 23 of the closure sheet 22. The semi-enclosed chamber E in combination with the sub-atmospheric pressure within an incubator is sufficient to insure that the discharge through the conduit 15 is restricted only to oxygen or a mixture of oxygen and whatever air is permitted to leak into the chamber E through the openings 23. In this manner a feed of pure oxygen can be positively insured by injecting a sufficient volume flow through tube 25. In this case a slight spillage of oxygen may occur through the openings 23 into the nursery. Alternatively, if a lower percentage of oxygen in the discharge is desired, for example 70 percent, the flow of oxygen through tube 25 can be reduced to permit some induction of air through the openings 23 even though inlet tube 25 is used.

It will now be apparent that we have provided an improved flow control unit especially adapted for an incubator. Our unit may be employed as a filter and additionally as means to blend oxygen and air at varying ratios, and also to maintain substantially the same ratio over varying demands in volume flow through the unit. Alternatively, our unit may be used to feed one hundred percent oxygen to an incubator.

Other forms embodying the features of the invention may be employed, change being made as regards the features herein disclosed, provided those stated by any of the following claims or the equivalent of such features be employed.

We therefore particularly point out and distinctly claim as our invention:

1. A flow control blending unit for an incubator and the like adapted to discharge substantially only oxygen or a blend of oxygen and air comprising a hollow conduit member having an entrance end to receive air and an exit end to discharge to an incubator, flow-restrictive means stationed within the conduit member between said entrance and exit ends, and an alternatively operative oxygen inlet tube carried by the conduit member adjacent each of said ends and communicating internally therewith on opposite sides of said flow-restrictive means, whereby flow of oxygen through the inlet tube adjacent the exit end of the conduit member and simultaneous non-flow through the other inlet tube induces air through said entrance end to discharge through the exit end a blend of air and oxygen, and flow of oxygen through the inlet tube adjacent the entrance end and simultaneous non-flow through the other inlet tube reduces such induction and confines the flow through the flow-restrictive means and to said exit end substantially to oxygen only.

2. A flow control unit as claimed in claim 1 wherein said flow-restrictive means is a filter.

3. A filter blender unit for an incubator and the like adapted to discharge substantially only oxygen or a blend of oxygen and air, comprising a casing having an open face to receive air therethrough and a conduit to release the discharge of such unit to an incubator, fibrous filter means disposed within the casing and across said open face, forward and rearward oxygen inlet tubes extending through the casing and communicating respectively with the upstream and downstream sides of the filter means, and a closure means engageable with either of said inlet tubes selectively to render one inoperative while the other is operative, said rearward inlet tube cooperating with said discharge conduit to effect an aspirating action through the unit, whereby flow of oxygen through the rearward inlet tube when the forward inlet tube is inoperative aspirates air through the open face and filter means to discharge a blend of oxygen and air out said conduit, and whereby flow of oxygen through the forward inlet tube when the rearward inlet tube is inoperative blankets said open face to restrict the discharge through said conduit to oxygen only.

4. A filter unit as defined in claim 3 wherein said closure means is cap means selectively to cover one of said inlet tubes.

5. A filter unit as defined in claim 3 wherein the terminal of said rearward inlet tube is substantially axially aligned with said discharge conduit to maintain substantially the same ratio of oxygen to air when that inlet tube is used over varying rates of volume flow through the unit.

6. A compact unit for an incubator and the like adapted to discharge substantially pure oxygen or a blend of oxygen and air comprising a casing having an open face on one side to receive air therethrough and a closed face on the opposite side provided with a discharge conduit adapted to be received by an incubator, a fibrous filter disposed within the casing and across said open face, a closure sheet carried by the casing across the open face in front of the fibrous filter and defining therebetween an entry chamber, air inlet means forming openings to allow limited air flow into such chamber, a first oxygen inlet tube communicating with said entry chamber and positioned to discharge substantially across said open face, and a second oxygen inlet tube extending within the casing rearwardly of the filter, and a closure means engageable with either of said inlet tubes selectively to render one inoperative while the other is operative, whereby flow of oxygen through the second inlet tube when the first inlet tube is inoperative aspirates air through said air inlet openings and filter to discharge a blend of such oxygen and air out said discharge conduit, and whereby flow of oxygen through said first inlet tube when the second inlet tube is inoperative into such entry chamber substantially blocks said air inlet openings to restrict the discharge through said conduit primarily to oxygen only, said second inlet tube being substantially axially aligned with said discharge conduit to maintain in discharging therethrough substantially the same ratio of oxygen to air over varying rates of volume flow through the unit.

7. A filter unit as defined in claim 6 wherein said closure sheet is composed of a transparent plastic.

8. A filter unit as defined in claim 6 further including a screen member disposed in said entry chamber and extending across the open face of said casing to support said fibrous filter in a flat plane.

9. A compact filter-blender unit comprising a casing having an open face on one side to receive air therethrough and a closed face on the opposite side provided with a discharge conduit selectively to release only oxygen or an air-oxygen blend, filter means disposed within the casing and transversely across said open face, a closure sheet having openings carried by the casing across the open face in front of the filter means and defining therebetween an entry chamber substantially enclosed except for said closure sheet openings to limit gas flow into such chamber, a first oxygen inlet tube communicating with said entry chamber and positioned to discharge substantially across said open face, and a second oxygen inlet tube extending within the casing rearwardly of the filter and disposed to discharge substantially through said discharge conduit of the closed face, said inlet tubes being alternatively operative whereby flow of said oxygen through the second inlet tube aspirates air through said closure openings and filter to discharge a blend of such oxygen and air out said discharge conduit, and whereby flow of oxygen through said first inlet tube into such entry chamber substantially blocks said closure openings to restrict the discharge through said conduit primarily to oxygen only.

10. In the process of advancing a first fluid through a conduit having flow-restrictive means and out an end of the conduit, the improvements of selectively blending a second fluid with the first fluid or restricting the flow substantially only to such second fluid, comprising the steps of admitting such second fluid substantially laterally of the conduit and only downstream of the flow-restrictive means to induce such first fluid into the conduit past the flow-restrictive means and to blend the two fluids prior to discharge from said end of the conduit, and alternatively admitting such second fluid substantially laterally of the conduit and only upstream of the flow-restrictive means to block entry of such first fluid into the conduit and restrict the discharge from such conduit substantially to the second fluid.

11. A flow control fluid-blending unit effective to discharge substantially only a first fluid or a mixture of said first fluid with a second fluid comprising a conduit member having internal flow-restrictive means disposed transversely of said member and defining on opposite sides thereof an entrance end for said second fluid and an exit end for said first fluid or defined mixture, two alternatively operative inlet means for said ends positioned on opposite sides of said flow-restrictive means for admission of said first fluid, whereby flow of said first fluid through the inlet means for the exit end and simultaneous non-flow through the other inlet means induce said second fluid through the entrance end to blend the two fluids together, and flow of said first fluid through the inlet means for the entrance end and simultaneous non-flow through the other inlet means block flow of said second fluid thereinto and confine the flow through the flow-restrictive means toward said exit end substantially to said first fluid.

12. A filter-blender unit effective to discharge substantially only a first gas or a blend of said first gas and a second gas comprising a casing having an opening to receive therethrough only said second gas and discharge means to release said first gas or defined blend, filter means disposed within and substantially transversely across the casing and stationed between said opening and discharge means effective to restrict flow through the casing, and a pair of alternatively operative side inlets extending through the casing and communicating with opposite sides of the filter means for the selective admission of said first gas through only one of said inlets at any one time, said inlets being so constructed and located with respect to said filter and discharge means to effect blending of said gases within the casing upon use of one side inlet and simultaneous non-use of the other inlet, and the restrict flow substantially solely of such first gas through the unit upon reverse use and non-use of said inlets.

13. An incubator apparatus having a gas intake port for delivering to the incubator air-oxygen mixtures of desired, controllable composition, blower means within the incubator effective to produce a slight negative pressure therein to induce the flow of said air-oxygen mixtures into said incubator and to discharge gas from said incubator into the surrounding atmosphere at a desired rate, and a blending device having separate air inlet means and oxygen supply means for selectively admixing air and oxygen and delivering the resulting mixture to said incubator gas intake, said blending device comprising a casing forming an enclosure having a partition therein defining an outlet chamber and an entry chamber, said air inlet means being connected with said entry chamber and conduit means connecting said outlet chamber with said incubator gas intake port, a passage containing porous filter means connecting said entry chamber and said outlet chamber such that the suction of said blower means induces a flow of air normally from said entry chamber through said filter passage and outlet chamber to said incubator, said oxygen supply means comprising alternately operable first and second delivery means communicating respectively with said outlet chamber and said entry chamber of said blending device, said first oxygen delivery means including a restricting nozzle effective upon discharge of oxygen therethrough into said entry chamber to produce a desired suction pressure therein and to induce a predetermined flow of air from said entry chamber through said filter passage to form a predetermined mixture of air and oxygen for delivery to the incubator and said second oxygen delivery means being effective upon controllable delivery of oxygen therethrough into said entry chamber to diminish or completely exclude the normal flow of air induced through said blending means to said incubator by said blower means.

References Cited in the file of this patent

UNITED STATES PATENTS

| | | |
|---|---|---|
| 470,403 | Robinson | Mar. 8, 1892 |
| 1,843,999 | White | Feb. 9, 1932 |
| 2,616,414 | McPherson | Nov. 4, 1952 |
| 2,633,842 | Higgs | Apr. 7, 1953 |
| 2,780,493 | McNair et al. | Feb. 5, 1957 |
| 2,781,230 | Pritchard | Feb. 12, 1957 |
| 2,795,291 | Pierce | June 11, 1957 |
| 2,820,477 | Dorsak et al. | Jan. 21, 1958 |
| 2,857,202 | Snyder | Oct. 21, 1958 |
| 2,899,971 | Munter | Aug. 18, 1959 |
| 2,913,120 | Glasby et al. | Nov. 17, 1959 |

FOREIGN PATENTS

| | | |
|---|---|---|
| 703,690 | France | Feb. 10, 1931 |